United States Patent
Tagawa et al.

(10) Patent No.: US 12,106,233 B2
(45) Date of Patent: Oct. 1, 2024

(54) PARAMETER-SEARCHING METHOD, PARAMETER-SEARCHING DEVICE, AND PROGRAM FOR PARAMETER SEARCH

(71) Applicant: SHIMADZU CORPORATION, Kyoto (JP)

(72) Inventors: Yusuke Tagawa, Kyoto (JP); Yuki Ishikawa, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 896 days.

(21) Appl. No.: 16/959,704

(22) PCT Filed: Apr. 24, 2019

(86) PCT No.: PCT/JP2019/017373
§ 371 (c)(1),
(2) Date: Jul. 2, 2020

(87) PCT Pub. No.: WO2019/244474
PCT Pub. Date: Dec. 26, 2019

(65) Prior Publication Data
US 2021/0089952 A1    Mar. 25, 2021

(30) Foreign Application Priority Data

Jun. 19, 2018  (JP) ................. 2018-116364

(51) Int. Cl.
*G06N 7/01*  (2023.01)
*G06F 16/951*  (2019.01)
(Continued)

(52) U.S. Cl.
CPC ............. *G06N 7/01* (2023.01); *G06F 16/951* (2019.01); *G06F 17/15* (2013.01); *G06N 20/00* (2019.01)

(58) Field of Classification Search
CPC ............ G06N 7/01; G06N 20/00; G06N 5/01; G06N 20/10; G06F 16/951; G06F 17/15; G01N 30/8658
See application file for complete search history.

(56) References Cited

U.S. PATENT DOCUMENTS 9,514,922 B2 * 12/2016 Watanabe ........... H01J 49/0036
10,726,349 B2 * 7/2020 Saklatvala ............... G06N 7/01
(Continued)

FOREIGN PATENT DOCUMENTS

JP       2018-73360 A    5/2018

OTHER PUBLICATIONS

Z. Xing and C. Beghein, "A Bayesian approach to assess the importance of crustal corrections in global anisotropic surface wave tomography," in Geophysical Journal International, vol. 203, No. 3, pp. 1832-1846, Oct. 2015, doi: 10.1093/gji/ggv401. (Year: 2015).*

(Continued)

*Primary Examiner* — Eunhee Kim
(74) *Attorney, Agent, or Firm* — Muir Patent Law, PLLC

(57) ABSTRACT

A model estimator (11) estimates a model function of an analyzing system (20) based on target observation data and reference observation data. For this estimation, the amount of variation between the model of the target system and that of a reference model is estimated from the target observation data and reference observation data. The model function of the target model is estimated after the observation data are corrected based on the estimated amount of variation. A parameter determiner (12) calculates an acquisition function based on the mean and covariance of the model function, and determines a parameter value for the next observation, using the acquisition function. A data acquirer (13) sets the parameter value in the analyzing system (20) and acquires a corresponding observed value. A loop process with the (Continued)

feedback of the observation data is repeated to determine an optimal parameter value. In the case of a parameter search using a multi-task Bayesian optimization method, the present technique improves the efficiency of the parameter search even if the correlation between the target observation data and reference observation data is low.

16 Claims, 11 Drawing Sheets

(51) Int. Cl.
    *G06F 17/15*     (2006.01)
    *G06N 20/00*     (2019.01)

(56) References Cited

U.S. PATENT DOCUMENTS

| | | | | |
|---|---|---|---|---|
| 2008/0114564 | A1* | 5/2008 | Ihara | G06F 16/35 702/158 |
| 2017/0255720 | A1* | 9/2017 | Satoh | G06F 30/20 |

OTHER PUBLICATIONS

Mueller et al."Development of a multi-target screening analysis for 301 drugs using a QTrap liquid chromatography/tandem mass spectrometry system and automated library searching." Rapid Communications in Mass Spectrometry: Rapid Commun. Mass Spectrom. 2005; 19: 1332-1338. (Year: 2005).*

Kevin Swersky et al., "Multi-Task Bayesian Optimization", Advances in Neural Information Processing Systems 26 (NIPS 2013 Proceedings), 2013, 9 pages, https://papers.nips.co/paper/5086-multi-task-bayesian-optimization.pdf.

Jasper Snoek et al., "Practical Bayesian Optimization of Machine Learning Algorithms", [online], NIPS, 2012, 9 pages.

C. E. Rasmussen et al., "Gaussian Processes for Machine Learning", the MIT Press, ISBN 026218253X, 2006, 266 pages.

International Search Report for PCT/JP2019/017373 dated Jul. 16, 2019.

Written Opinion of the International Searching Authority (ISA237) for PCT/JP2019/017373 dated Jul. 16, 2019.

* cited by examiner

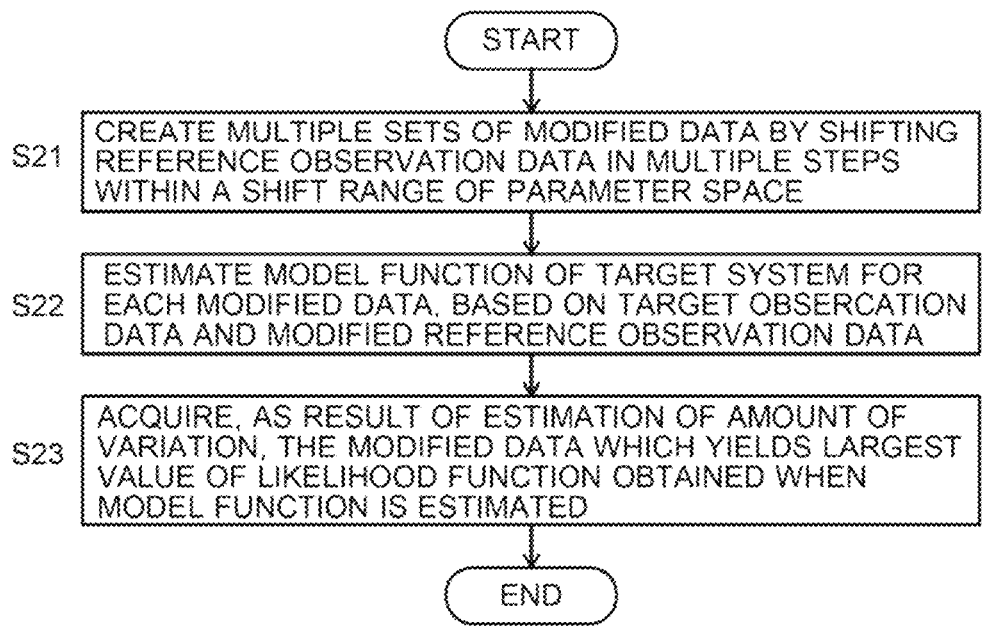

Fig. 11A
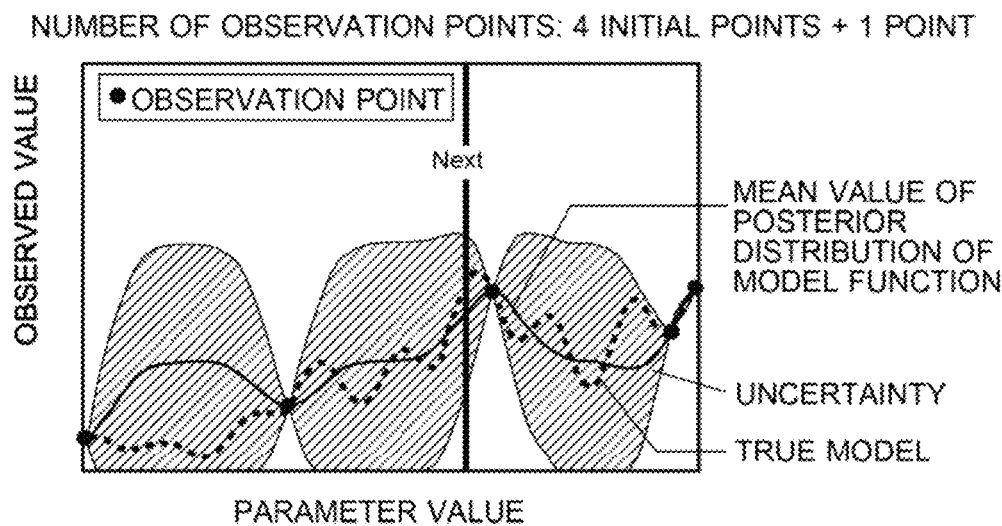
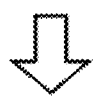
Fig. 11B
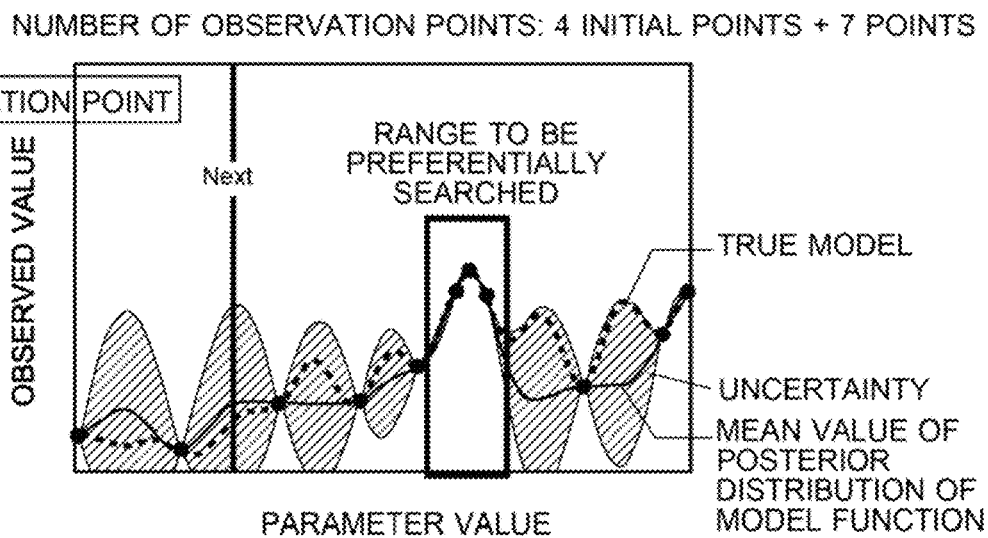

GAIN CHANGED

σ CHANGED

μ CHANGED

PARAMETER-SEARCHING METHOD, PARAMETER-SEARCHING DEVICE, AND PROGRAM FOR PARAMETER SEARCH

CROSS-REFERENCE TO RELATED APPLICATIONS

This application is a National Stage of International Application No. PCT/JP2019/017373 filed on Apr. 24, 2019, which claims priority under U.S.C. § 119(a) to Japanese Patent Application No. JP2018-116364 filed on Jun. 19, 2018, the disclosure of which is incorporated herein in its entirety by reference.

TECHNICAL FIELD

The present invention relates to a parameter-searching method, parameter-searching device and computer program for a parameter search configured to search for an optimal or approximately optimal value of a parameter as an analysis condition in an analyzing device or similar system in which an observed value changes when the parameter value is changed.

BACKGROUND ART

For example, in a liquid chromatograph mass spectrometer (LC-MS), when one of the voltages respectively applied to the ion source, various ion transport optical systems, ion detector and other components in the mass spectrometer is changed, the signal intensity value for the same sample changes. Therefore, the task of tuning the values of those applied voltages as parameters is performed in advance of a measurement to achieve the highest possible level of measurement sensitivity. In normal cases, such a tuning task is often performed by a method which includes the steps of carrying out a measurement multiple times, with the value of one parameter gradually changed each time in predetermined steps over a predetermined range, and comparing the signal intensity values respectively acquired through the measurements to select, as the optimal parameter value, a parameter value which gives the highest signal intensity.

When searching for an optimal value of a parameter in the previously described manner, it is preferable to search for the optimal value with the smallest possible number of times of the measurement. This is because performing a measurement a large number of times requires a considerable amount of time and labor. Furthermore, if a standard sample is used in the measurement for the parameter search, performing the measurement a large number of times significantly increases the amount of standard sample to be consumed.

The task of searching for a parameter value which yields the largest (or in some cases, smallest) observed value is not limited to the LC-MS. Similar tasks are generally performed in various types of analyzing devices, measurement devices and instrumentation devices, as well as various systems including such devices. A similar parameter search is also performed in various apparatuses and systems which do not perform actual measurements or analyses, such as a system which performs computer simulation based on molecular dynamics, or a system which executes a machine learning algorithm on a computer, such as deep learning.

The previously described problem can be generalized as the problem of "searching for a parameter value which yields the best observed value in a repetitive experiment". The best observed value is normally the largest observed value. However, depending on the purpose of the experiment or observation, or other factors, it may be a different kind of value, such as an observed value with the highest signal-to-noise ratio, or smallest observed value.

As one example, FIG. 10A shows a case in which an observation for four different values related to a specific parameter (e.g. voltage) has already been completed, with four observed values obtained as indicated by the dots in the figure. Now, consider the situation in which it is desired to search for the next parameter value that is expected to yield an even higher observed value than the four observed values.

If an operator makes a personal judgment on the selection of the parameter value to be set for the next measurement, the selection of the next parameter value inevitably varies depending on what form of experimental target model is assumed, as indicated by the dotted line and the long-dashed short-dashed line in FIG. 10B (A or B in FIG. 10B).

One commonly known parameter-searching technique addressing such a problem is Bayesian optimization (see Patent Literature 1 or other related documents). The Bayesian optimization can determine the next parameter value (experimental condition) which is probabilistically expected to yield a satisfactory result, based on previously acquired observation data. FIG. 10C shows the result of an experiment in which an experimental target model was estimated from the four aforementioned observed values by Bayesian optimization, and a search for the next parameter value to be observed was performed. In FIG. 10C, the curve shown by the solid line indicates the mean value of the posterior distribution of the model function estimated by Bayesian optimization. The shaded areas show the uncertainty for variance) of the posterior distribution of the model function. The thick vertical line labelled "Next" indicates the next parameter value which has been automatically selected.

A more detailed description of the Bayesian optimization is as follows: A mean value and variance value of the posterior distribution of the model function are calculated based on previously acquired observation data, on the assumption that the experimental target model follows a Gaussian process. Based on the calculated values, the next experimental condition (parameter value) which is expected to improve the model and make it closer to the true model is determined. Under the determined experimental condition, the next experiment is performed to acquire new observation data. After adding this data to the previously acquired observation data, the posterior distribution of the model function is once more estimated. By repeating such a procedure, a parameter value which yields a high level of observed value can be obtained.

FIGS. 11A and 11B are diagrams showing one example of the parameter search using the Bayesian optimization. Specifically, FIG. 11A shows the state in which one more observed value has been added to the four initially observed values (the same as shown in FIG. 10A), while FIG. 11B shows the state in which seven more observed values have been added to the four initially observed values (the same as shown in FIG. 10A). In FIGS. 11A and 11B, the dots indicate the observed values, while the curve shown by the solid line indicates the mean value of the posterior distribution of the estimated model function. The curve shown by the dotted represents the true model. The shaded areas show the uncertainty of the posterior distribution of the model function. The thick vertical line labelled "Next" indicates the next parameter value which has been automatically selected. As shown in FIG. 11B, as the experiment is repeated with the parameter value gradually changed, the parameter search becomes more preferentially performed within a range near the parameter value which gives the highest observed value.

Thus, a parameter value which yields the highest observed value or a value close to the highest value can be ultimately located.

However, the normal version of the Bayesian optimization as previously described has the problem that the estimation accuracy of the posterior distribution of the model function is low in the initial phase of the search in which the number of observation points is small, so that it is difficult to efficiently perform the search. In recent years, to address this problem, an improved version of the Bayesian optimization has been proposed, called the multi-task Bayesian optimization (see Non Patent Literature 1). Multi-task Bayesian optimization is premised on the presence of the data acquired through an experiment which is the target to be observed (which is hereinafter called the "target experiment") as well as the data acquired through a related experiment (which is hereinafter called the "reference experiment"). A model of the target experiment is estimated on the assumption that there is a significant correlation between the target observation data acquired through the target experiment and the reference observation data acquired through the reference experiment. As demonstrated in Non Patent Literature 1, the multi-task Bayesian optimization has an advantage in that it can estimate the model of the target experiment with a considerably high level of accuracy based on the reference observation data even in the initial phase of the search in which the number of observation points is small, thereby improving the searching efficiency, particularly in the initial phase of search.

CITATION LIST

Patent Literature

Patent Literature 1: JP 2018-73360 A

Non Patent Literature

Non Patent Literature 1: K. Swersky and two other authors, "Multi-Task Bayesian Optimization", [online], [accessed on Jun. 1, 2018], NIPS, 2013, the Internet
Non Patent Literature 1: J. Snoek and two other authors, "Practical Bayesian Optimization of Machine Learning Algorithms", [online], NIPS, 2012

SUMMARY OF INVENTION

Technical Problem

The conventionally proposed multi-task Bayesian optimization method is premised on the idea that there is a high degree of correlation between the model of the target experiment and that of the reference experiment. For example, in the case of an analyzing device, this is due to the assumption that an analyzing device used for the target experiment and one used for the reference experiment are two individual analyzing devices which yet belong to the same model, or they are two different models of analyzing devices which yet employ the same method. However, in practice, it is not always possible to prepare target observation data and reference observation data which are sufficiently correlated with each other.

As one example, consider three models created by changing the gain, standard deviation to ($\sigma$) and mean value ($\mu$) of an original model, respectively, using an original model which follows a Gaussian function indicated by the thick solid line in FIGS. 12A and 12B. The correlation coefficients between the original model and the three models are 1, 0.96 and 0.36, respectively. The shape of the function of each model after the change is similar to that of the original model. However, a significant decrease in the correlation coefficient between the original model and the changed model particularly occurs when the latter model is created by shifting the original model in the direction of the horizontal axis, i.e. in the direction in which the parameter value is changed (FIG. 12C).

A study by the present inventors has revealed that using reference observation data and target observation data which are insufficiently correlated with each other as in the previously described example may possibly prevent the multi-task Bayesian optimization from correctly estimating the model of the target experiment, and consequently lower the efficiency of the parameter search. One example of such a situation is shown in FIGS. 13A and 13B, which show the result of a test of the multi-task Bayesian optimization for the case where the true model of the target experiment is shifted from the true model of the reference experiment. In those figures, the thick dotted line represents the true model of the reference experiment. The thick long-dashed short-dashed line represents the true model of the target experiment. The square dots indicate the observation points of the reference experiment. The circular dots indicate the observation points of the target experiment. The thick solid line represents the mean value of the posterior distribution of the target-experiment model. The shaded areas show the uncertainty of the posterior distribution of the target-experiment model.

FIG. 13A is the result in the case where the number of points of the target observation data is one, while FIG. 13B shows the result in the case where the number of points of the target observation data was increased to five. If the parameter search has been properly performed, the uncertainty of the posterior distribution of the target-experiment model should decrease with an increase in the number of points of the target observation data. However, in the present example, an area near the optimal condition in the reference experiment is preferentially searched by mistake due to an incorrect estimation of the model, so that an optimal parameter value cannot be determined despite the increased number of points observed in the target experiment. Thus, in the conventional multi-task Bayesian optimization method, if the correlation between the target observation data and the reference observation data is low, the reference observation data cannot be effectively used, and the extent of the improvement in the efficiency of the parameter search is reduced. In the worst case scenario, the searching efficiency may become lower than in the case of a parameter search which uses only the target observation data.

The present invention has been developed to solve the previously described problem. Its objective is to provide a parameter-searching method, device and program capable of efficiently searching for an optimal parameter by using a multi-task Bayesian optimization method even when the correlation between the data acquired through a reference experiment and those acquired through a target experiment is low due to a change of the former data from the latter data within the parameter space.

Solution to Problem

A parameter-searching method according to the present invention developed for solving the previously described problem is a parameter-searching method configured to search for a parameter value with which an observed value or an index value derived from the observed value satisfies a predetermined condition in a target system which outputs the observed value by performing an observation under the parameter value, the parameter-searching method including:
  a model estimation step which is a step configured to estimate a posterior distribution of a model function of the target system based on target observation data observed with the target system and reference observation data observed with a reference system related to the target system, the model estimation step including a variation estimation step configured to estimate the amount of variation between the target observation data and the reference observation data within a parameter space based on the two kinds of observation data, and the model estimation step further configured to estimate the posterior distribution of the model function after a correction corresponding to the estimated amount of variation is made;
  a parameter determination step configured to determine a parameter value which is a condition for the next observation, based on the posterior distribution of the model function acquired through the model estimation step; and
  a data acquisition step configured to set the determined parameter value in the target system, and acquire target observation data from the target system,
and the parameter-searching method further configured to search for a more appropriate parameter value by repeating the processing of the model estimation step, the parameter determination step and the data acquisition step.

A parameter-searching device according to the present invention developed for solving the previously described problem is a device for carrying out the parameter-searching method according to the present invention. The parameter-searching device is configured to search for a parameter value with which an observed value or an index value derived from the observed value satisfies a predetermined condition in a target system which outputs the observed value by performing an observation under the parameter value, the parameter-searching device including:
  a model estimation section configured to estimate a posterior distribution of a model function of the target system based on target observation data observed with the target system and reference observation data observed with a reference system related to the target system, the model estimation section including a variation estimation section configured to estimate the amount of variation between the target observation data and the reference observation data within a parameter space based on the two kinds of observation data, and the model estimation section further configured to estimate the posterior distribution of the model function after a correction corresponding to the estimated amount of variation is made;
  a parameter determination section configured to determine a parameter value which is a condition for the next observation, based on the posterior distribution of the model function acquired by the model estimation section;
  a data acquisition section configured to set the determined parameter value in the target system, and acquire target observation data from the target system; and
  a control section configured to control the model estimation section, the parameter determination section, and the data acquisition section so as to repeatedly perform processing operations by those sections.

A program for a parameter search according to the present invention developed for solving the previously described problem is a computer program for executing, on a computer, the parameter-searching method according to the present invention. The program is configured to search for a parameter value with which an observed value or an index value derived from the observed value satisfies a predetermined condition in a target system which outputs the observed value by performing an observation under the parameter value, the program further configured to make a computer operate as:
  a model estimation functional section configured to estimate a posterior distribution of a model function of the target system based on target observation data observed with the target system and reference observation data observed with a reference system related to the target system, the model estimation functional section including a variation estimation functional section configured to estimate the amount of variation between the target observation data and the reference observation data within a parameter space based on the two kinds of observation data, and the model estimation functional section further configured to estimate the posterior distribution of the model function after a correction corresponding to the estimated amount of variation is made;
  a parameter determination functional section configured to determine a parameter value which is a condition for the next observation, based on the posterior distribution of the model function acquired by the model estimation functional section;
  a data acquisition functional section configured to set the determined parameter value in the target system, and acquire target observation data from the target system; and
  a control functional section configured to control the model estimation functional section, the parameter determination functional section, and the data acquisition functional section so as to repeatedly perform processing operations by those sections.

The target system for which a parameter value should be searched for in the present invention includes devices or systems which perform measurements or observations by physical or chemical techniques, such as various types of analyzing devices, measurement devices, instrumentation devices and observation devices, as well as systems which can acquire an observed value through computer-based processing only, such as a simulation based on molecular dynamics or computational processing based on a machine learning algorithm, such as deep learning.

The program for a parameter search according to the present invention is a program configured to operate a computer, such as a multi-purpose personal computer, more sophisticated computer, or dedicated computer embedded in various systems. Such a program can be offered to users in the form of a non-transitory record medium recording the program, such as a CD-ROM, DVD-ROM, memory card or USB memory (dongle). It may also be offered to users in the form of data transferred through the Internet or similar communication network. Understandably, in the case where a user newly purchases a system, the program according to the present invention can be previously installed on a computer included in that system.

The basic parameter-searching algorithm in the parameter-searching method according to the present invention is the multi-task Bayesian optimization. That is to say, in order to estimate the posterior distribution of the model function of the target system, a set of reference observation data observed with the reference system is used in addition to the target observation data observed with the target system. However, the given set of reference observation data is not directly used for the estimation of the posterior distribution of the model function, but the amount of variation between the target observation data and the reference observation data within a parameter space is estimated based on the two kinds of observation data. The parameter space has the same number of dimensions as the number of kinds of parameters. Accordingly, if there are two kinds of parameters, the parameter space is a two-dimensional space.

The variation between the target observation data and the reference observation data, i.e. the variation between the model of the target system and that of the reference system, can be expressed in various forms, such as the rotation, shift (translation) or expansion/contraction within the parameter space. All of these forms of variation could be considered in evaluating the variation in shape of the model function. However, it is often the case that merely considering the shift as the form of variation is sufficient, since in many cases it is the shift that significantly contributes to a decrease in the correlation between the two kinds of data. Thus, as one mode of the present invention, the amount of variation may be the amount of shift between the target observation data and the reference observation data within the parameter space.

Provided that the amount of variation is the amount of shift, if the parameter space is a one-dimensional space, the variation estimation step may be configured to estimate the amount of shift on the assumption that the shift only occurs in the one-dimensional direction. Any of the two following methods can be used for the estimation of the amount of variation.

In one of the two variation-estimating methods, the posterior distribution of the model function of the system for the target observation data and the posterior distribution of the model function of the system for the reference observation data are independently estimated, the correlation between the two models is determined for each of a plurality of different amounts of variation given to one of the model functions within the parameter space, and the amount of variation which yields the highest degree of correlation is adopted as an estimated value.

This method has an advantage in that the calculation of the posterior distribution of the model function, which requires a considerable amount of computing time and a corresponding amount of calculation cost, only needs to be performed two times. However, since a certain number of data points is needed for accurate determination of the posterior distribution of the model function, this method is rather unsuited for use in the case where there are only a small number of data points.

In the other variation-estimating method, the posterior distribution of the model function is estimated for each of a plurality of different amounts of variation given to either the target observation data or the reference observation data within the parameter space, and the amount of variation which yields the smallest error between a mean-value model of the posterior distribution of the model function and the corresponding observation data is adopted as an estimated value.

Although the second method requires a longer computing time than the first method, an advantage exists in that it can accurately estimate the amount of variation even when the number of data points is small, since the estimation of the variation value is based on both the target observation data and the reference observation data as well as an error of the model functions.

In particular, as the second method for estimating the amount of variation, a method may be used in which the posterior distribution of the model function is calculated on the assumption that the model function follows a Gaussian process, and the amount of variation which shows the highest degree of likelihood in the maximum likelihood estimation of a hyperparameter of the Gaussian process is adopted as an estimated value.

This method shortens the computing time since the estimation of the model function by the hyperparameter of the Gaussian process and the calculation of an index of the amount of variation (e.g. acquisition function) within the parameter space are concurrently performed.

Any of the previously described methods can estimate an appropriate amount of variation. After the amount of variation has been estimated, for example, the amount of variation is used as a correction value to correct the posterior distribution of the model function of the target system estimated on the basis of the target observation data and the reference observation data. Therefore, the posterior distribution of the model function acquired in this manner reflects the amount of variation between the target observation data and the reference observation data. In the parameter determination step, the parameter value which is a condition for the next observation is determined based on the posterior distribution of the corrected model function acquired in the previously described manner.

In the data acquisition step, the determined parameter value is set as the next condition in the target system, and the target observation data including a value observed with the target system as a piece of information is acquired. This increases the amount of target observation data. The processing operations in the model estimation step, parameter determination step and data acquisition step described to this point are repeatedly performed until a predetermined termination condition is satisfied, to ultimately acquire a parameter value which is considered to be optimal. During such a repetitive process, a model in which the amount of variation between the target observation data and the reference observation data has been corrected is used in the model estimation step. Therefore, even if the correlation between the target observation data and the reference observation data is low, an appropriate parameter value can be located with a small number of repetitions.

If there are many variation factors to be considered, it is necessary to set a plurality of variations for each factor and estimate which factor is the most suitable. By limiting the variation factor to the shift which most significantly contributes to the decrease in correlation in the previously described manner, the computing time can be shortened while ensuring a sufficient effect for the correction of the amount of variation.

Advantageous Effects of Invention

According to the present invention, the correlation between the target observation data and the reference observation data is substantially increased by correcting the amount of variation between the two kinds of data, whereby the accuracy of the estimation of the posterior distribution of the model function is improved. Therefore, in particular, even if the number of target observation data is small, the reference observation data can be effectively used to efficiently perform the parameter search. That is to say, a parameter value which is optimal or approximately optimal can be located with a smaller number of repetitions.

BRIEF DESCRIPTION OF DRAWINGS

FIG. 5 is a flowchart showing the process flow of the second method for estimating the amount of variation in the parameter-searching device according to the present embodiment.

FIGS. 11A and 11B are diagrams showing one example of the parameter search by a Bayesian optimization method.

DESCRIPTION OF EMBODIMENTS

One embodiment of the parameter-searching method according to the present invention as well as the device and computer program for carrying out the method is hereinafter described with reference to the attached drawings.

Figure 1:
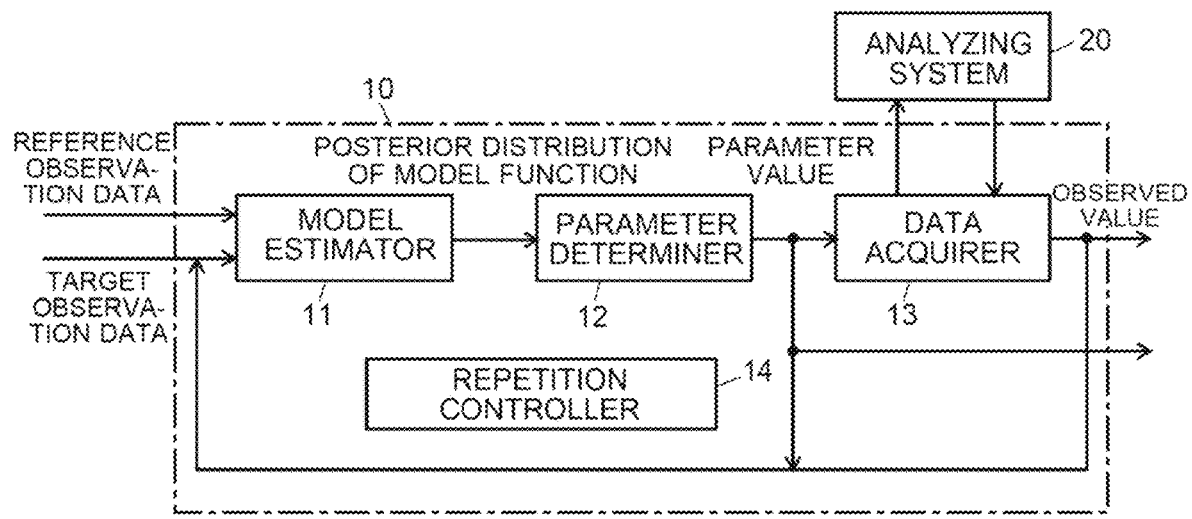
FIG. 1 is a schematic block configuration diagram of a parameter-searching device as one embodiment of the present invention.

FIG. 1 is a schematic block configuration diagram of a parameter-searching device according to the present embodiment.

The present parameter-searching device 10 includes a model estimator 11, parameter determiner 12, data acquirer 13 and repetition controller 14 as its functional blocks. An analyzing system 20, which corresponds to the target system in the embodiment of the present invention, is not included in the parameter-searching device 10. This system is configured to perform a predetermined type of analysis, such as a mass spectrometric analysis or chromatographic analysis, under a given parameter value, to acquire an observed value as an analysis result. Consider the case where the analyzing system 20 is a mass spectrometer. In this case, for example, the parameter value is the value of the voltage applied to an ion transport optical system, while the observed value is the signal intensity value at a specific mass-to-charge ratio acquired by a mass spectrometric analysis for a standard sample. Needless to say, this is a mere example, and the analyzing technique for the analyzing system 20 is not limited to this example. Additionally, this system may be replaced by a different system, as will be described later.

The model estimator 11 estimates the posterior distribution of the model function of the analyzing system 20, which is the target system, based on the reference observation data and the target observation data. The target observation data is a set of data including observed values acquired with the analyzing system 20. The reference observation data is a set of data including observed values acquired with a reference system, which is different yet similar to the target system.

The parameter determiner determines a parameter value which is a condition for the next observation (i.e. analysis) to be performed in the target system, based on the estimated posterior distribution of the model function of the target system. The data acquirer 13 sends the determined parameter value as an analysis condition to the analyzing system 20, and receives an observed value acquired in the analyzing system 20 by a predetermined analysis using that parameter value as one condition.

The repetition controller 14 adds the observation data including the observed value acquired with the data acquirer 13 and the set parameter value to the target observation data, as well as controls the operations of the model estimator 11, parameter determiner 12 and data acquirer 13 so as to repeatedly perform the same processing. The parameter-searching device 10 repeatedly performs this feedback routine a number of times to search for an optimal or approximately optimal parameter value.

It is not impossible for the functions of the sections constituting the parameter-searching device 10 to be implemented, for example, on a hardware circuit including a digital signal processor. However, in practice, it is preferable to realize same of those functions, or most of the functions exclusive of some components (e.g. the interface for connection with the analyzing system 20), by installing a program on a computer and executing it on the same computer. Such a program call be offered to users in the form of a non-transitory record medium recording the program, such as a CD-ROM, DVD-ROM, memory card or USB memory (dongle). It may also be offered to users in the form of data transferred through the Internet or similar communication network.

Figure 2:
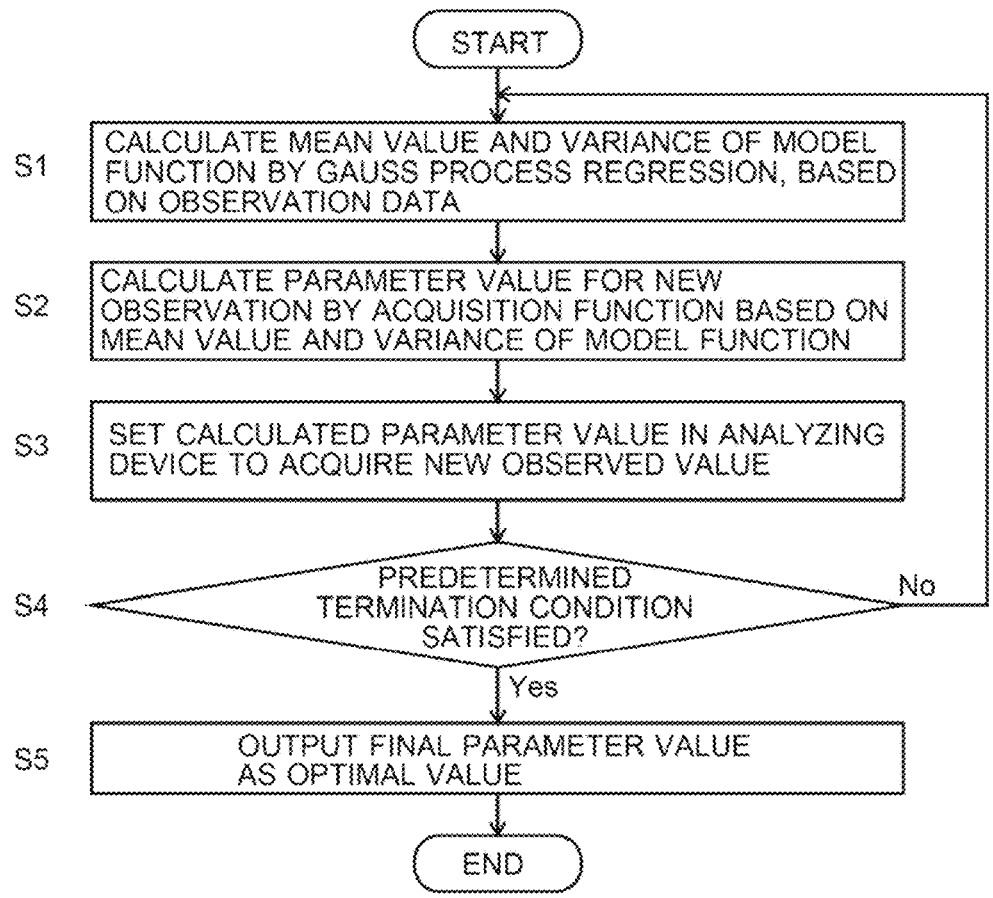
FIG. 2 is a flowchart showing the process flow of a parameter search in the parameter-searching device shown in FIG. 1.

The process flow and the operations of the related sections in the parameter search are hereinafter described in detail with reference to the flowchart shown in FIG. 2.

As is evident from the following descriptions, the basic process steps follow the algorithm of the multi-task Bayesian optimization method disclosed in Non Patent Literature 1 or other related documents.

Initially, the model estimator 11 estimates the posterior distribution of the model function f(x) of the system on the assumption that the model function fellows a Gaussian process, for example. According to Non Patent Literature 2, it is commonly known that the function f(x), which follows a Gaussian process, is a function expressed by a mean function value m(x) and a covariance matrix k(x, x'), as shown in the following equation (1):

$$f(x) \sim GP(m(x), k(x,x')) \qquad (1)$$

The covariance-matrix is a function which expresses "to what extent the outputs f(x) and f(x') at two positions x and x' of the variable behave in a similar manner". The covariance matrix is normally defined as a continuous monotonic function whose value increases as the two positions x and x' of the variable becomes closer to each other. For example, an RFB kernel, Matern 5/2 kernel, or other appropriate kernels are used. Equation (2) is an example of the RFB kernel:

$$k_{RBF}(x, x')=\theta_0 \exp(-\|x-x'\|^2/2\theta_1^2) \quad (2)$$

The function-mean-value model m(x) in equation (1) may be replaced by a value of 0 to simplify the calculation. However, it is normally preferable to use a mean value of the observation data as the function-mean-value model m(x).

Consider the situation in which n pieces of observation data $(x_n, y_n)$ have already been acquired. Based on those observation data, the model estimator 11 determines the mean value μ and variance $\sigma^2$ of the posterior distribution of the model function (Step S1). The mean value μ and variance $\sigma^2$ are calculated by the following equations (3) and (4) according to the formulae of the multivariate normal distribution:

$$\mu(x;\{x_n,y_n\})=K(X,x)^T K(X,X)^{-1}(y-m(X)) \quad (3)$$

$$\sigma^2(x;\{x_n,y_n\})=k(x,x)-K(X,x)^T K(X,X)^{-1} K(X,x) \quad (4)$$

Since both the reference observation data and the target observation data are used in the present case, the covariance function is extended as follows by introducing a covariance matrix $K_t(t, t')$ representing the covariance between the tasks in the multi-task operation:

$$K_{multi}((x,t),(x',t'))=K_t(t,t')[\times]K_x(x,x') \quad (5)$$

where [×] denotes the Kronecker product.

The hyperparameter θ in the kernel function expressed by equation (2) or similar equation needs to be set at an appropriate value for the model function. Accordingly, the hyperparameter θ is calculated, for example, by maximum likelihood estimation so that a likelihood function L(θ) which expresses the likelihood of the estimated value of y for a given value of θ is maximized. The logarithmic likelihood function log L(θ) of function f(x) is expressed by the following equation (6):

$$\log L(\theta)=(-\tfrac{1}{2})y^T K(X, X)^{-1}y-(\tfrac{1}{2})\log|K(X, X)|-(n/2)\log 2\pi \quad (6)$$

where $\mathrm{argmax}_\theta L(\theta)$ is a common type of optimization problem, which can be solved, for example, by a quasi-Newton's method or similar gradient method.

The parameter determiner 12 receives the mean function value μ(x) and variance value $\sigma^2(x)$ of the posterior distribution of the model function f(x) from the model estimator 11, and calculates the acquisition function a(x) for evaluation based on these values. Then, the parameter determiner 12 locates a parameter value x which gives the lamest value of the acquisition function a(x), and outputs the located value as the parameter value for the next analysis conditions under which a better observed value can be expected (Step S2). As for the acquisition function a(x), any acquisition function commonly used for Bayesian optimization can be used, such as Probability of Improvement (PI), Expected Improvement (EI), or Upper Confidence Bound (UCB).

As one example, equation (7) shows an equation using the Expected Improvement method (see Non Patent Literature 2):

$$EI(x)=(\mu(x)-f(x^+))\Phi(Z)+\sigma(x)\phi(Z), \text{ if } \sigma(x)>0, \text{ or}$$
$$EI(x)=0, \text{ if } \sigma(x)=0 \quad (7)$$

The term $f(x^+)$ represents the largest value of the observation data, Φ(*) is an accumulated distribution function of the standard normal distribution, and φ(*) is an operator representing the standard normal distribution. Expected Improvement calculates an expected value of the function which exceeds the largest value of the observation data in the posterior distribution model of function f(x). It is commonly known as a function which can perform the global search and local search in a well-balanced fashion.

The data acquirer 13 sets the parameter value which is given from the parameter determiner 12 in the previously described manner, as an analysis condition in the analyzing system 20 and acquires the observed value corresponding to the same value (Step S3). The analyzing system 20 may be any system which observes some value under an inputted parameter value. For example, it may be a system for experiments, such as an analysis-instrumentation system or control system. It may also be a system for simulation (e.g. molecular dynamics) or a system which executes a machine learning algorithm, such as deep learning.

Next, the repetition controller 14 determines whether or not a previously specified repetition-terminating condition has been satisfied (Step S4). For example, the repetition-terminating condition may be defined as the point in time where the number of repetitions of the routine has reached a previously set value, or the point in time where the observed value has reached a previously set target value (or has entered a target range). If the repetition-terminating condition is not yet satisfied, the target observation data including the newly acquired value and the corresponding parameter value are added to the observation data, and the control proceeds from Step S4 to Step S1 to repeat the previously described processing of Steps S1 through S3. If the repetition-terminating condition has been satisfied, the final parameter value is outputted as the optimal value, which is the search result (Step S5), and the processing is completed.

Figure 3:
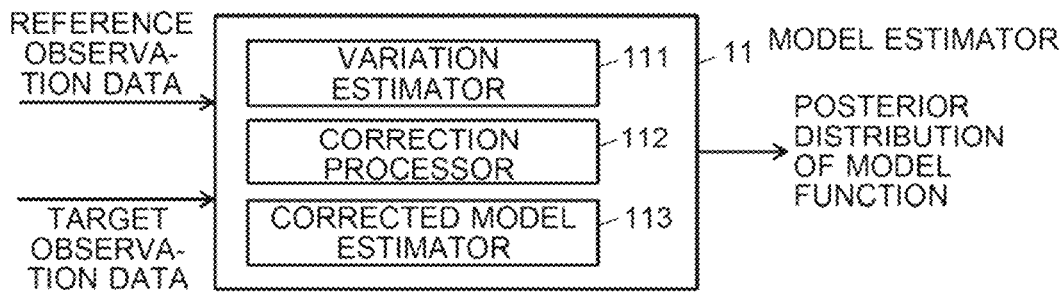
FIG. 3 is a block configuration diagram of a model estimator in the parameter-searching device according to the present embodiment.

The contents of the foregoing descriptions are identical to the processing of the commonly performed multi-task Bayesian optimization method. A feature of the parameter-searching device 10 according to the present embodiment exists in that data correction is performed in the model estimator 11 when the correlation between the reference observation data and the target observation data is low. This point will be further described in detail with reference to FIGS. 3-5. FIG. 3 is a functional block configuration diagram showing the details of the model estimator 11 in the parameter-searching device according to the present embodiment.

If the correlation between the reference observation data and the target observation data is low, it is unlikely that the two outputs f(x, t) and f(x', t') for respective data (x, t) and (x', t') of two tasks show similar behaviors. Therefore, the reference observation data will be rather useless for the estimation of the model function of the target system. Specifically, using a highly correlated covariance matrix as the covariance matrix $K_t(t, t')$ will lead to an incorrect estimation of the model, whereas using a poorly correlated covariance matrix as the covariance matrix $K_t(t, t')$ will cause the multiple tasks to be treated as independent tasks, which means that the process is practically no longer of multi-task design.

Accordingly, in the parameter-searching device according to the present embodiment, the model estimator 11 includes a variation estimator 111, correction processor 112 and corrected model estimator as its functional blocks. The variation estimator 111 computationally gives a rotation, shift, expansion/contraction or other types of variation within the parameter space, and predicts the amount of variation between the reference observation data and the target observation data. The correction processor 112 corrects observation data by the predicted amount of variation. The corrected model estimator 113 performs the model estimation in the previously described manner based on the corrected observation data.

Figure 6A:
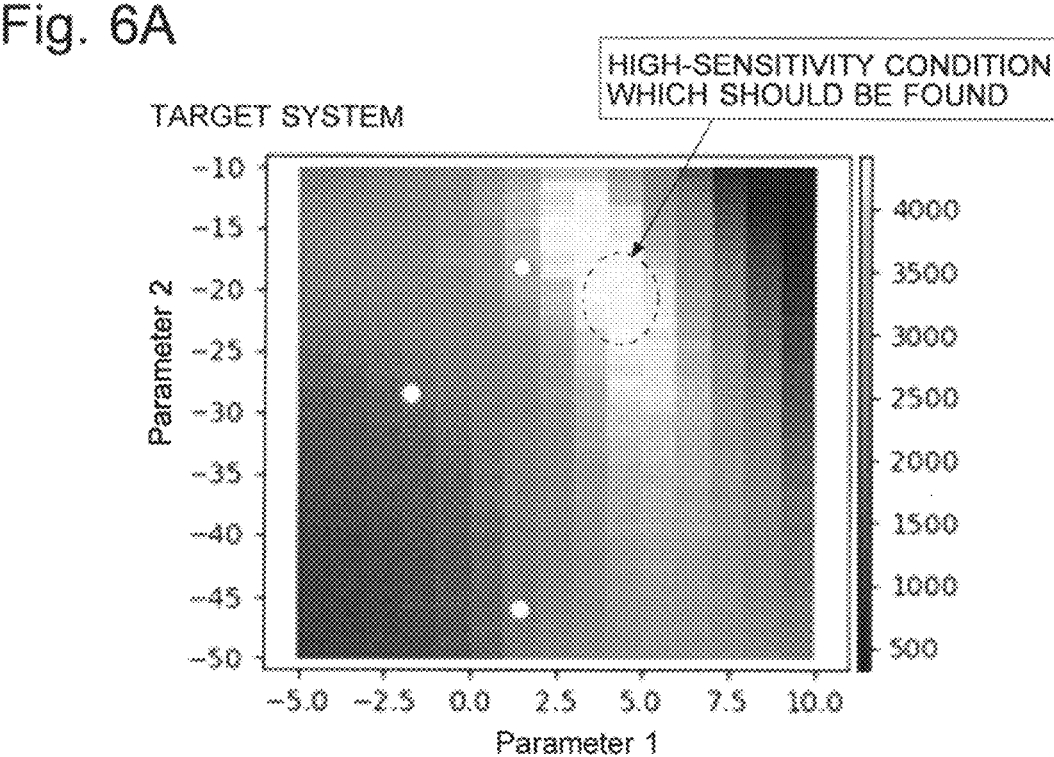
FIGS. 6A and 6B are charts showing one example of the model of the reference system and that of the target system shifted from each other.
Figure 6B:
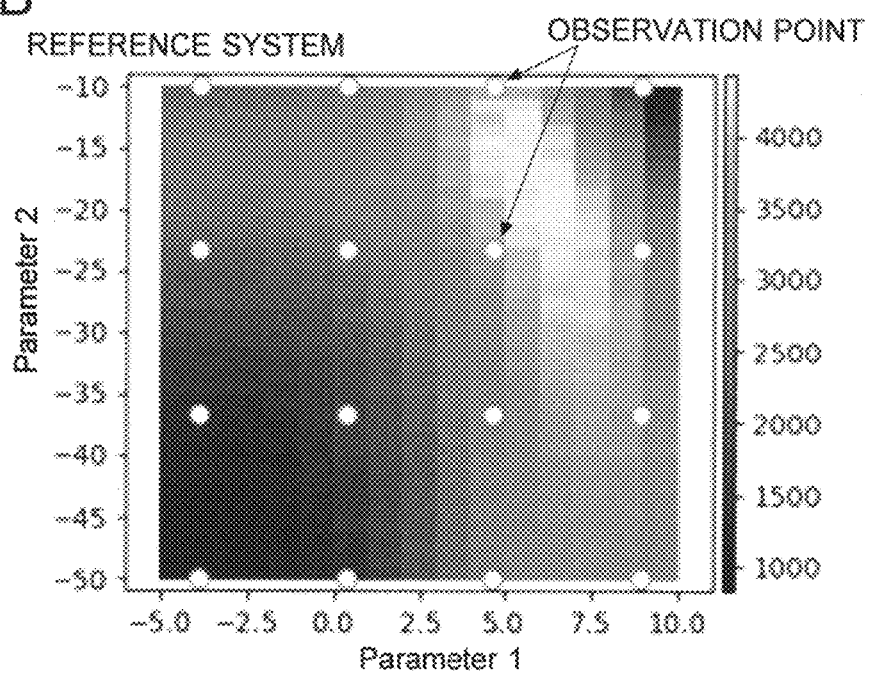

A specific description is hereinafter given, taking the example of a system configured to acquire an observed value with respect to two kinds of parameters. FIGS. 6A and 6B are gray-scaled (actually, color-scaled) charts showing the observed value with respect to the combination of different kinds of parameters (Parameter 1 and Parameter 2), with the two parameters assigned to the horizontal and vertical axes, respectively. Each of the charts represents a model of a system which shows what value will be obtained through the observation under what combination of the parameter values. FIG. 6B shows a model of the reference system, for which it is assumed that 16 observed values have already been acquired as reference observation data under the combinations of the parameter values corresponding to the 16 points indicated by the regularly distributed white dots. FIG. 6A shows a model of the target system which is the target of the parameter search, for which there are only three observed values already acquired under the combinations of the parameter values corresponding to three randomly located points. The problem to be addressed now is to efficiently search for an optimal combination of the parameter values, starting from the presently assumed conditions.

It should be noted that the model of the target system shown in FIG. 6A is an artificially created model having a low correlation between the target system and the reference system, which was created from the model of the reference system shown in FIG. 6B by individually shifting each piece of the reference observation data in the direction of Parameter 1 (in the horizontal direction in FIGS. 6A and 6B) by an amount within a range from to −1 to −4. The resultant model of the target system is equivalent to a model obtained by shifting the model of the reference system in the direction of Parameter 1 by −2.

When the reference observation data and the target observation data as just described are given, the variation estimator 111 can estimate the amount of variation within the parameter space by any of the following two methods.

[First Method for Estimating Amount of Variation]

Figure 4:
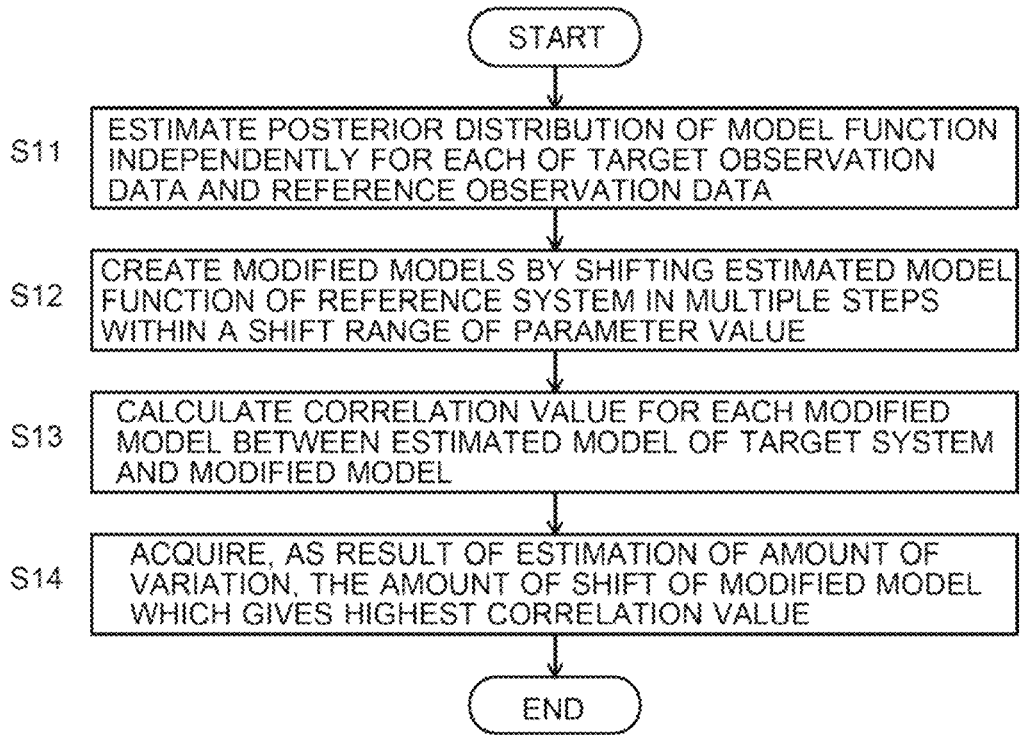
FIG. 4 is a flowchart showing the process flow of the first method for estimating the amount of variation in the parameter-searching device according to the present embodiment.

The first method for estimating the amount of variation is a method including the steps of independently estimating the posterior distribution of the model unction of the system for each of the target observation data and the reference observation data, calculating a correlation value between the two models while giving a variation to the model function of one of those models within a parameter range that covers the expected amount of variation, and adopting, as the estimated value, the amount of variation which shows the highest correlation. FIG. 4 shows the process flow in this method.

Initially, the posterior distribution of the model faction is estimated by performing the maximum likelihood estimation of the hyperparameter of the Gaussian process for each of the given target observation data and reference observation data independently (Step S11). Subsequently, modified models are created each of which consists of a set of shift data obtained from data based on the estimated model of the reference system by shifting each piece of data in each of the two directions of Parameter 1 and Parameter 2 in steps of one within a range from −5 to +5 (Step S12). Consequently, the same number of modified models of the reference system as the total number of combinations of the amounts of shift of the two parameters are created.

Subsequently, the correlation value between each modified model of the reference system and the model of the target system is calculated (Step S13). For example, the sum of the correlation values between the observed values at the same parameter values can be used as the correlation value. The combination of the amounts of shift which shows the largest correlation value among the obtained correlation values is adopted as the estimated value of the amount of variation (Step S14). After the amount of variation has thus been estimated, the correction processor 112 corrects the target observation data based on the amount of variation. The corrected model estimator 113 can now estimate the model function of the target system in the previously described manner based on the corrected target observation data and the reference observation data.

By this method, the model estimation only needs to be performed two times for determining the amount of variation one time. The model estimation normally requires a considerable amount of computation. The larger the number of times of the model estimation is, the longer the computing time becomes. Requiring the model estimation to be performed only two times is advantageous in that the amount of computation is significantly reduced.

[Second Method for Estimating Amount of Variation]

The second method for estimating the amount of variation is a method including the steps of estimating the posterior distribution of the model function while giving different amounts of variation to either the target observation data or the reference observation data, and adopting, as the estimated value, the amount of variation which yields the smallest error between a mean-value model of the posterior distribution and the observation data. FIG. 5 shows the process flow in this method.

Initially, a plurality of sets of modified data are created by shifting a set of given reference observation data in each of the two directions of Parameter 1 and Parameter 2 in steps of one within a range from −5 to +5 (Step S21). Consequently, the same number of sets of the modified data based on the reference observation data as the total number of combinations of the amounts of shift of the two parameters are created. Subsequently, based on each set of the created modified data and a set of given target observation data, the posterior distribution of the model function of the target system is estimated by the maximum likelihood estimation of the hyperparameter of the Gaussian process in the normal mode of multi-task Bayesian optimization (Step S22). Therefore, in the present case, it is necessary to perform the model estimation the same number of times as the total number of combinations of the amounts of shift of the two parameters. In this model estimation process, a likelihood function for the maximum likelihood estimation is obtained. The combination of the amounts of shift which yields the largest value of the likelihood function is determined, and this amount of shift is adopted as the estimate value of the amount of variation (Step S23).

After the amount of variation has thus been estimated, the correction processor 112 corrects the target observation data based on the amount of variation. The corrected model estimator 113 can now estimate the model function of the target system in the previously described manner based on the corrected target observation data and the reference observation data.

Figure 7A:
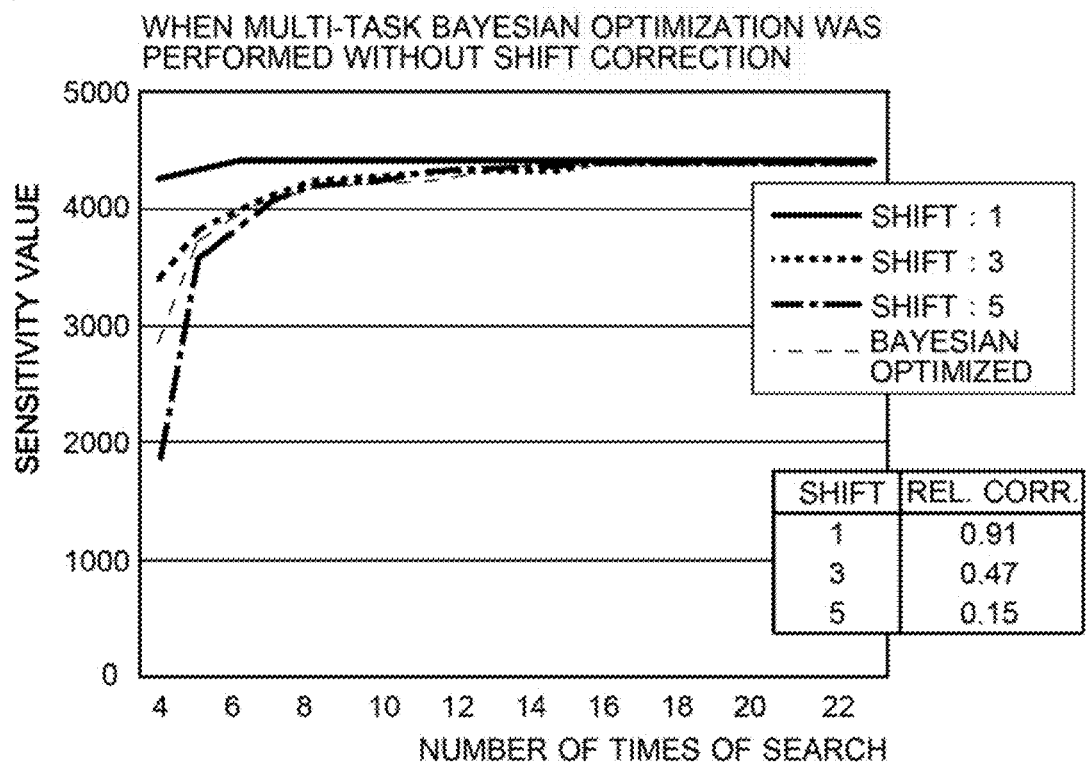
FIGS. 7A and 7B are graphs showing a comparison of the parameter-search result obtained without a shift correction (conventional method) and one obtained with a shift correction (a method according to the present invention) for data acquired with the system shown in FIGS. 6A and 6B.
Figure 7B:
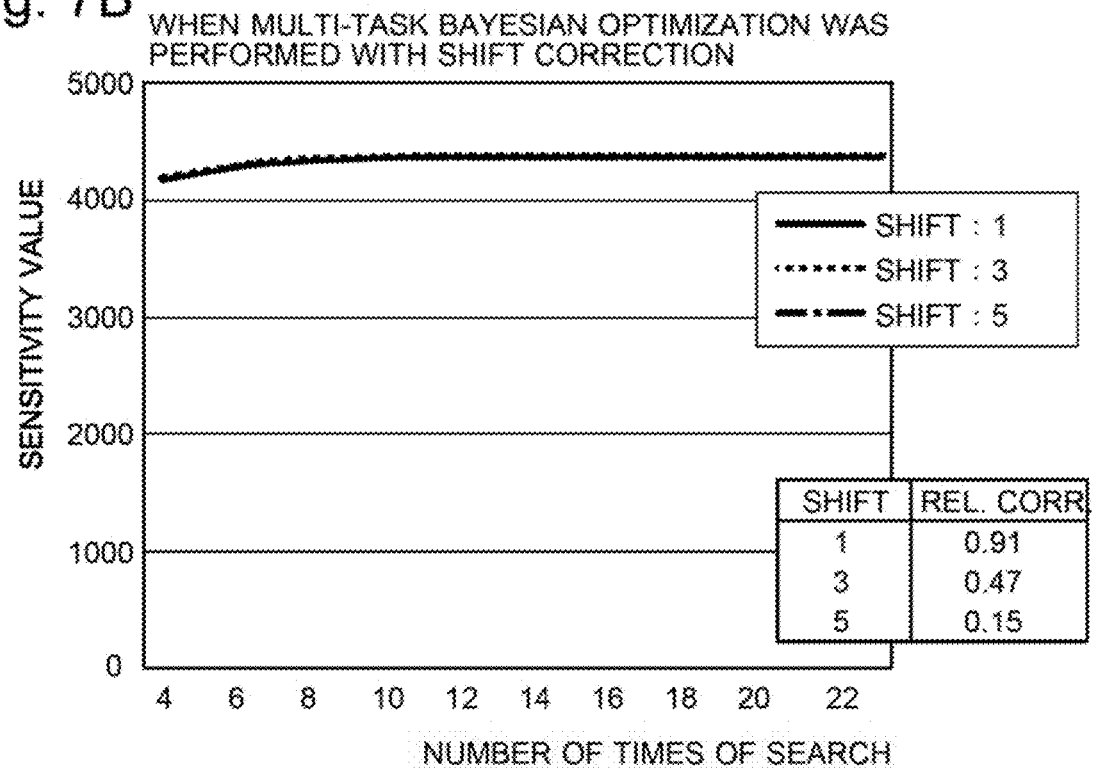

FIGS. 7A and 7B show an effect obtained by estimating the amount of variation of the observation data by the second method for estimating the amount of variation, and then determining the optimal parameter value by performing multi-task Bayesian optimization after correcting the variation. In FIGS. 7A and 7B, the horizontal axis indicates the number of times of the search (the number of repetitions of the loop of Steps S1 through S4 in FIG. 2), while the vertical axis represents the largest value of the observed value obtained under the determined parameter value. Specifically, FIG. 7A shows the result obtained when the amount of shill was not corrected (which is the case of the conventional multi-task Bayesian optimization), while FIG. 7B shows the result obtained when the amount of shift was corrected (which is the case of the method according to one embodiment of the present invention). These results demonstrate that the optimal parameter value could be located with a small number of times of the search by the method according to the embodiment of the present invention even when the correlation between the reference system and the target system was low (in FIGS. 7A and 7B, even when the amount of shift was 3V or 5V).

Figure 12A:
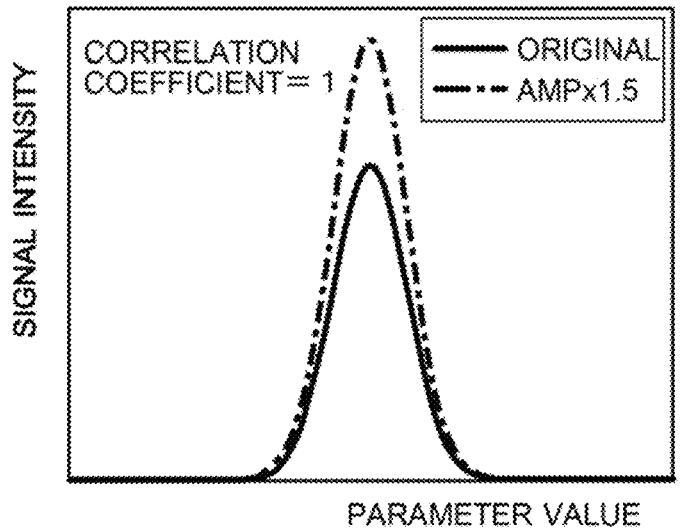
FIGS. 12A-12C are diagrams showing three models created by changing the gain, standard deviation, and mean value of an original model, using a Gaussian function as the original model.
Figure 12B:
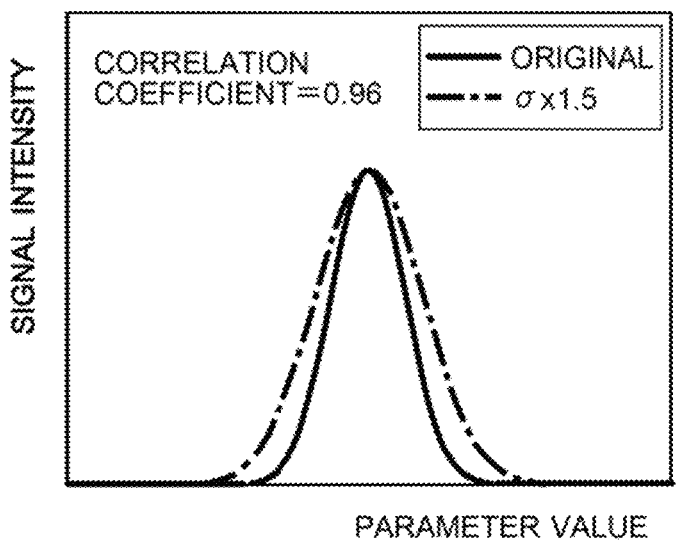
Figure 12C:
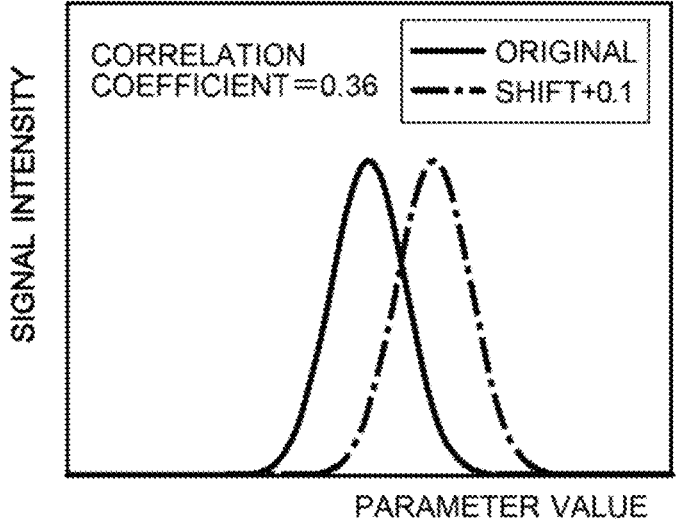
Figure 13A:
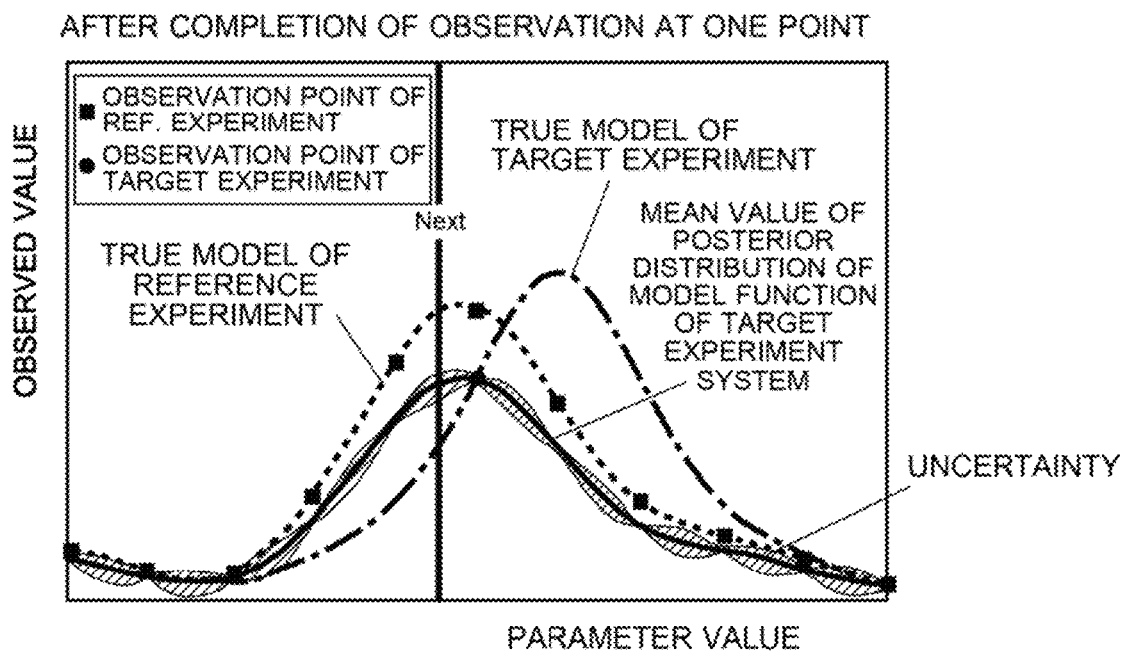
FIGS. 13A and 13B are diagrams showing Me example of the case where the parameter search cannot be properly performed by multi-task Bayesian optimization.
Figure 13B:
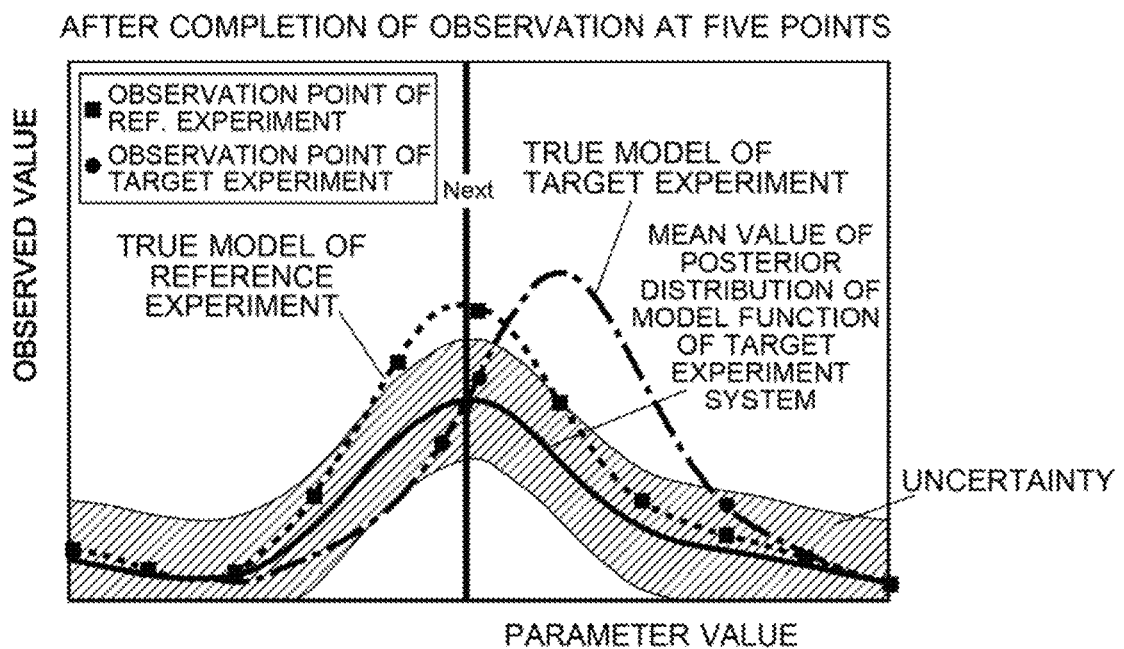

In the previously described specific example, only a simple shift was considered as the variation of the model or data. In FIGS. 12A-12C, this corresponds to the case of FIG. 12C in which the mean value was changed from the original signal. In a many cases, the parameter space has two or more dimensions, and the expansion/contraction, rotation or other forms of variation also occur within the parameter space. However, a correction in which only the shift is considered as the variation is sufficiently effective for improving the efficiency of the parameter search can be obtained, since the reference system is related to the target system, and a decrease in correlation between the models of the two systems is primarily caused by the shift.

Figure 8A:
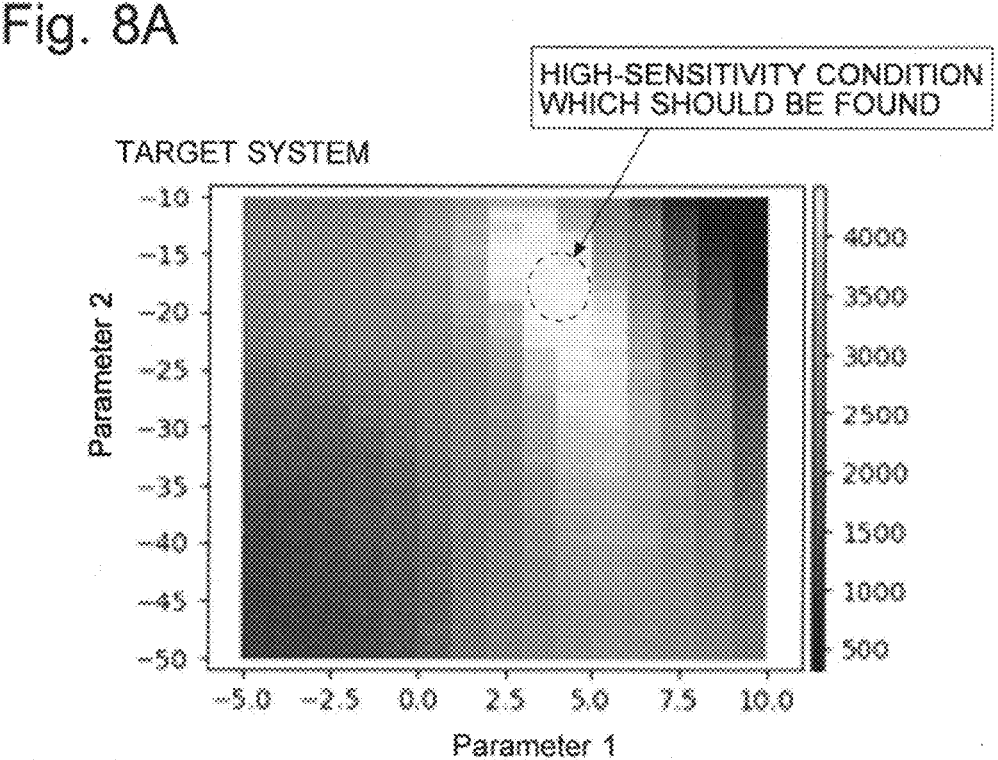
FIGS. 8A and 8B are charts showing an example in which the model of the reference system and that of the target model have different model functions.
Figure 8B:
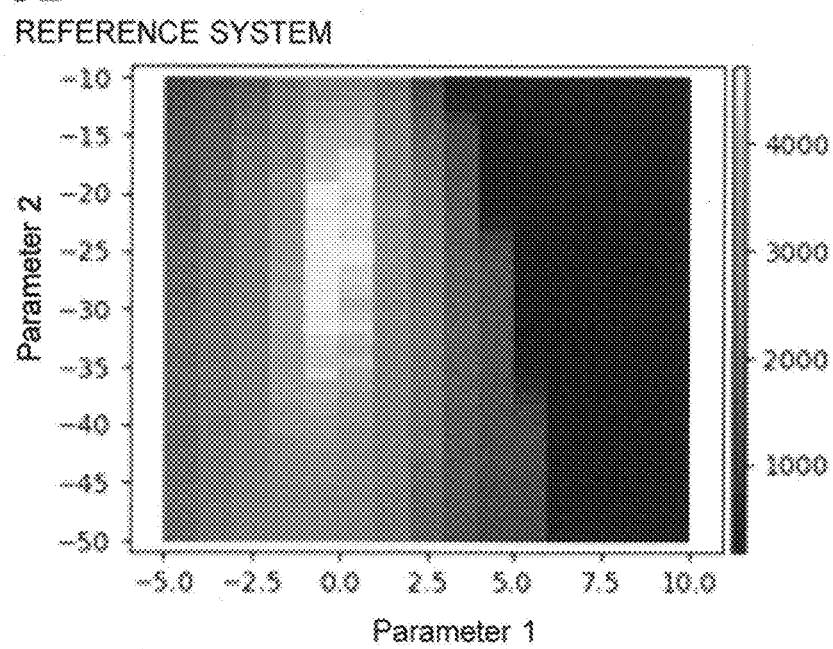
Figure 9:
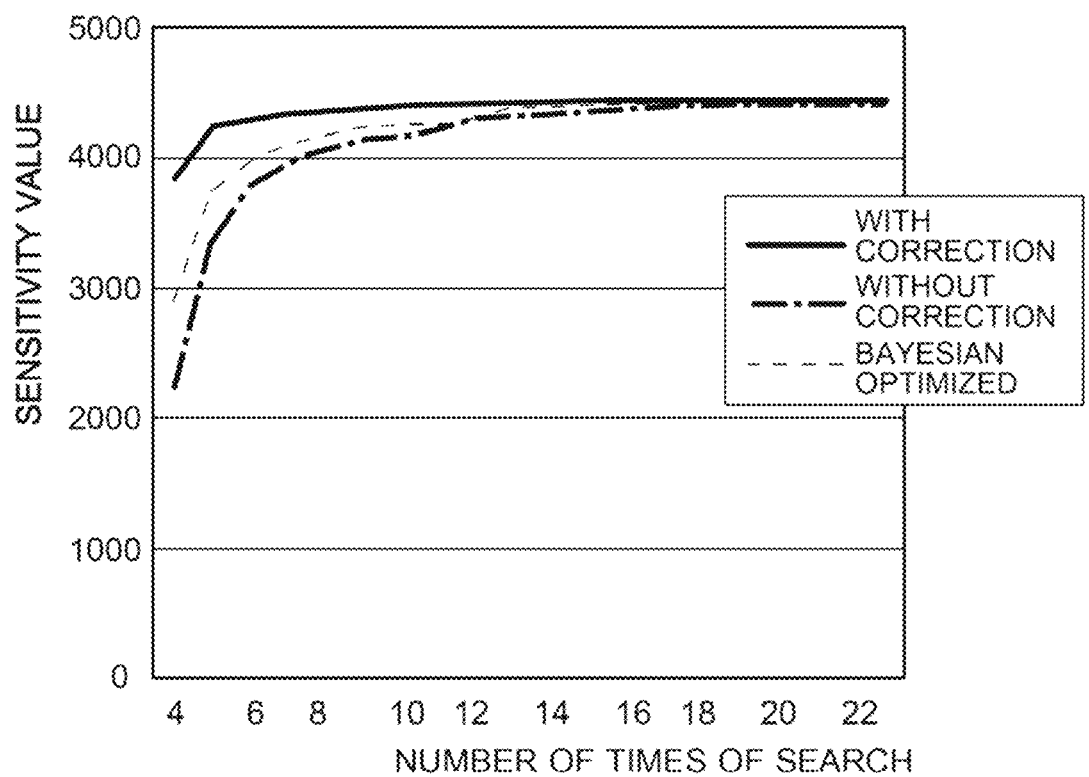
FIG. 9 is a graph showing a comparison of the parameter-search result obtained without a shift correction (conventional method) and one obtained with a shift correction (a method according to the present invention) for data acquired with the system shown in FIGS. 8A and 8B.
Figure 10A:
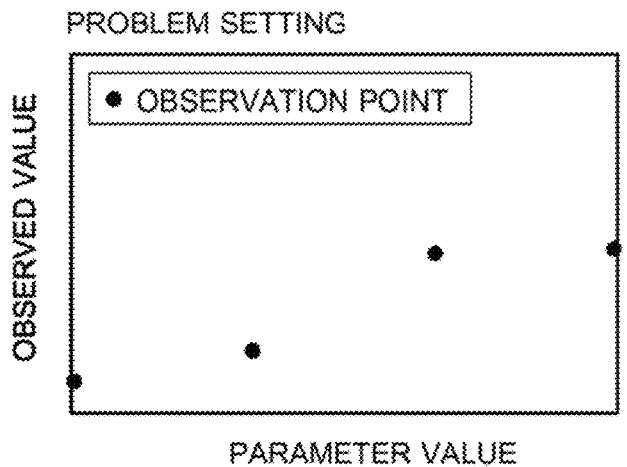
FIGS. 10A-10C are diagrams showing one example of the problem setting and its solution in parameter search.
Figure 10B:
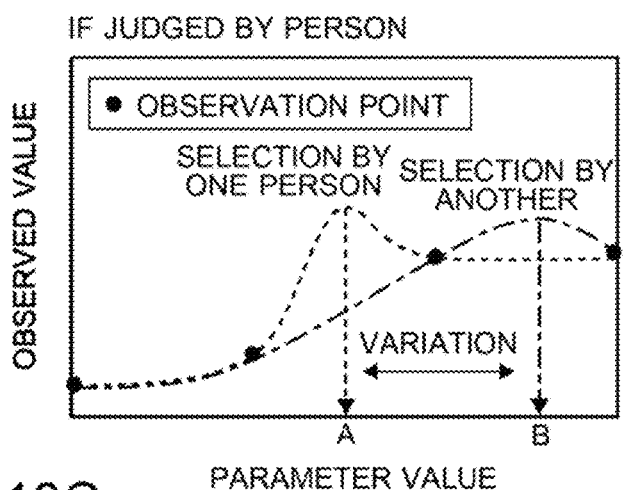
Figure 10C:
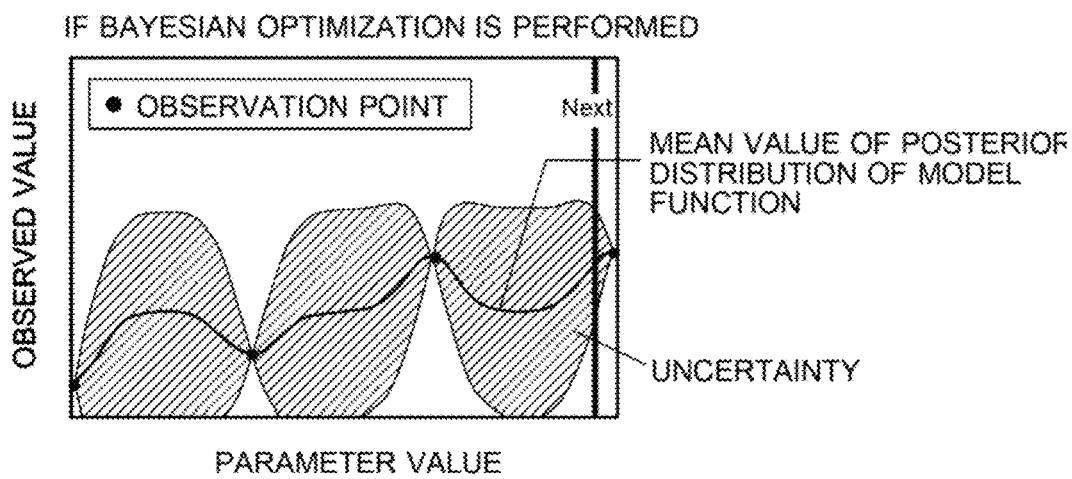

FIGS. 8A and 8B show a model of the reference system and that of the target system, as with FIGS. 6A and 6B. A difference exists in that those models are not simply shifted from each other. The reference system and the target system are different from each other in basic design of the model. FIG. 9 shows the result of a comparison of the elects obtained for the models shown in FIGS. 8A and 8B by determining the optimal parameter value by a normal Bayesian optimization method, conventional multi-task Bayesian optimization method with no correction performed), and a method according to the embodiment of the present invention (with correction performed). It should be noted that the variation-estimating method was the same as the second method for estimating the amount of variation described earlier, in which only the shift was considered as the variation.

As is evident from FIG. 9, the optimal parameter was successfully located with only a small number of times of the search by the method according to the embodiment of the present invention. This confirms that, even when the variation of the model between the reference system and the target system is not merely due to the shift, the efficiency of the parameter search can be sufficiently improved by estimating and correcting the amount of variation on the assumption that the variation is merely due to the shift.

It is certainly possible to consider rotation, expansion/contraction and/or other forms of variation between the reference system and the target system. However, increasing the number of variation factors leads to an increase in the number of modified models to be created in Step S12 or that of the modified data to be created in Step S21. This dramatically increases the amount of computation and causes the computing time to be longer. As compared to such an increase in load, the extent of the improvement in the efficiency of the parameter search is rather small. Therefore, it is not particularly beneficial to consider variations other than the shift.

In the embodiment shown in FIG. 1, there are various possible devices (systems) as the analyzing system 20, such as a mass spectrometer or chromatograph apparatus. A specific example in which an efficient parameter search is particularly required is the optimization of the parameters for a multiple reaction monitoring (MRM) measurement in an LC-MS or GC-MS employing a tandem mass spectrometer. In an MRM measurement, parameters which allow for a high-sensitivity measurement must be searched for based on the result of an actual measurement. Interface parameters related to the section which ionizes a sample to be subjected to the measurement include temperature, gas flow rate and many other parameters that require a waiting time until they are stabilized. Furthermore, the optimal parameter values vary depending on the kind of compound, mobile phase and other related conditions. For these reasons, the parameter search possibly requires a considerable length of time or consumes a significant amount of sample. As in those cases, when there are a large number of parameters to be searched for and the measurement for locating one parameter requires a considerable amount of time, applying the present invention is particularly effective for the time reduction and sample saving since the parameter can be efficiently located with a small number of times of the measurement.

The previously described embodiment is a mere example of the present invention. Any change, modification, addition or the like appropriately made within the spirit of the present invention will naturally fall with the scope of claims of the present application.

For example, as noted earlier, the system in which the parameter-searching method according to the present invention can be applied is not limited to analyzing systems. The present invention is applicable in any type of system as long as the system is configured to acquire an observed value under some parameter conditions, or is configured to calculate an index value, such as a signal-to-noise ratio or dynamic range, from the acquired value. The kinds of parameters are also not specifically limited as long as they can be expressed in numerical forms.

REFERENCE SIGNS LIST

10 . . . Parameter-Searching Device
11 . . . Model Estimator
111 . . . Variation Estimator
112 . . . Correction Processor
113 . . . Corrected Model Estimator
12 . . . Parameter Determiner
13 . . . Data Acquirer
14 . . . Repetition Controller

The invention claimed is:

1. A parameter-setting method to obtain a parameter value with which an observed value or an index value derived from the observed value satisfies a predetermined condition in a target chromatograph and/or spectrometer system which outputs the observed value by performing an observation under a given parameter value, the target chromatograph and/or spectrometer system being a physical or chemical analysis system configured to perform a predetermined type of physical or chemical analysis of samples, and to set the parameter value in the target chromatograph and/or spectrometer system, the parameter-setting method comprising:

a model estimation step to estimate a posterior distribution of a model function of the target chromatograph and/or spectrometer system based on target observation data observed with the target chromatograph and/or spectrometer system and reference observation data observed with a reference system related to the target chromatograph and/or spectrometer system, the model estimation step including a variation estimation step to estimate an amount of variation between the target observation data and the reference observation data within a parameter space based on the two kinds of observation data, and the model estimation step further estimates a posterior distribution of the model function after a correction corresponding to the estimated amount of variation is made;

a parameter determination step to determine a parameter value which is a condition for a subsequent observation, based on the posterior distribution of the model function acquired through the model estimation step;

a data acquisition step to set the determined parameter value in the target chromatograph and/or spectrometer system, and acquire additional target observation data from the target chromatograph and/or spectrometer system by performing the predetermined type of physical or chemical analysis of a sample while the determined parameter value is set in the target chromatograph and/or spectrometer system;

repeating a process of the model estimation step, the parameter determination step and the data acquisition step to update the determined parameter value;

setting an updated determined parameter value in the target chromatograph and/or spectrometer system as an optimal parameter value of the target chromatograph and/or spectrometer system; and performing a measurement with the target chromatograph and/or spectrometer system with the updated determined parameter value set in the target chromatograph and/or spectrometer system.

2. The parameter-setting method according to claim 1, wherein the amount of variation is an amount of shift between the target observation data and the reference observation data within the parameter space.

3. The parameter-setting method according to claim 1, wherein, in the variation estimation step, the posterior distribution of the model function of the system for the target observation data and the posterior distribution of the model function of the system for the reference observation data are independently estimated, a correlation between the model function of the system for the target observation data and the model function of the system for the reference observation data is determined for each of a plurality of different amounts of variation given to one of the model functions within the parameter space, and the amount of variation which yields a highest degree of correlation is adopted as an estimated value.

4. The parameter-setting method according to claim 1, wherein, in the variation estimation step, the posterior distribution of the model function is estimated for each of a plurality of different amounts of variation given to either the target observation data or the reference observation data within the parameter space, and the amount of variation which yields a smallest error between a mean-value model of the posterior distribution of the model function and the corresponding observation data is adopted as an estimated value.

5. The parameter-setting method according to claim 4, wherein, in the variation estimation step, the posterior distribution of the model function is calculated on an assumption that the model function follows a Gaussian process, and the amount of variation which shows a highest degree of likelihood in a maximum likelihood estimation of a hyperparameter of the Gaussian process is adopted as the estimated value.

6. The parameter setting method according to claim 1, wherein the predetermined type of physical or chemical analysis measures a physical amount related with the samples.

7. A apparatus including a chromatograph and/or spectrometer system and a parameter setting device configured to obtain a parameter value with which an observed value or an index value derived from the observed value satisfies a predetermined condition in the chromatograph and/or spectrometer system which outputs the observed value by performing an observation under a given parameter value, the chromatograph and/or spectrometer system being an analysis system configured to perform a predetermined type of physical or chemical analysis of samples, the apparatus comprising:

the chromatograph and/or spectrometer system comprising at least one of a chromatograph and a spectrometer;

a model estimation section configured to estimate a posterior distribution of a model function of the chromatograph and/or spectrometer system based on target observation data observed with the chromatograph and/or spectrometer system and reference observation data observed with a reference system related to the chromatograph and/or spectrometer system, the model estimation section including a variation estimation section configured to estimate an amount of variation between the target observation data and the reference observation data within a parameter space based on the two kinds of observation data, and the model estimation section further configured to estimate a posterior distribution of the model function after a correction corresponding to the estimated amount of variation is made;

a parameter determination section configured to determine a parameter value which is a condition for a subsequent observation, based on the posterior distribution of the model function acquired by the model estimation section;

a data acquisition section configured to set the determined parameter value in the chromatograph and/or spectrometer system, and acquire additional target observation data from the chromatograph and/or spectrometer system by performing the predetermined type of physical or chemical analysis of a sample while the determined parameter value is set in the chromatograph and/or spectrometer system; and a control section configured to control the model estimation section, the parameter determination section, and the data acquisition section so as to repeatedly perform processing operations by the model estimation section, the parameter determination section, and the data acquisition section to repeatedly update the determined parameter value;

wherein the data acquisition section is configured to set an updated determined parameter value in the chromatograph and/or spectrometer system as an optimal parameter value of the chromatograph and/or spectrometer system so that the chromatograph and/or spectrometer system is configured with the updated determined parameter to perform measurements.

8. The apparatus according to claim 7, wherein the amount of variation is an amount of shift between the target observation data and the reference observation data within the parameter space.

9. The apparatus according to claim 7, wherein the variation estimation section is configured to estimate the posterior distribution of the model function of the system for each of the target observation data and the reference observation data independently, determine a correlation between the model function of the system for the target observation data and the model function of the system for the reference observation data for each of a plurality of different amounts of variation given to one of the model functions within the parameter space, and adopt, as an estimated value, the amount of variation which yields a highest degree of correlation.

10. The apparatus according to claim 7, wherein the variation estimation section is configured to estimate the posterior distribution of the model function for each of a plurality of different amounts of variation given to either the target observation data or the reference observation data within the parameter space, and adopt, as an estimated value, the amount of variation which yields a smallest error between a mean-value model of the posterior distribution of the model function and the corresponding observation data.

11. The apparatus according to claim 10, wherein the variation estimation section is configured to calculate the posterior distribution of the model function on an assumption that the model function follows a Gaussian process, and adopt, as the estimated value, the amount of variation which shows a highest degree of likelihood in a maximum likelihood estimation of a hyperparameter of the Gaussian process.

12. A non-transitory computer readable medium recording a program for a parameter setting method to obtain a parameter value with which an observed value or an index value derived from the observed value satisfies a predetermined condition in a target chromatograph and/or spectrometer system which outputs the observed value by performing an observation under a given parameter value, the target chromatograph and/or spectrometer system being an analysis system configured to perform a predetermined type of physical or chemical analysis of samples, and to set the parameter value in the target chromatograph and/or spectrometer system, wherein the program is further configured to make a computer operate as:
a model estimation functional section configured to estimate a posterior distribution of a model function of the target chromatograph and/or spectrometer system based on target observation data observed with the target chromatograph and/or spectrometer system and reference observation data observed with a reference system related to the target chromatograph and/or spectrometer system, the model estimation functional section including a variation estimation functional section configured to estimate an amount of variation between the target observation data and the reference observation data within a parameter space based on the two kinds of observation data, and the model estimation functional section further configured to estimate a posterior distribution of the model function after a correction corresponding to the estimated amount of variation is made;
a parameter determination functional section configured to determine a parameter value which is a condition for a subsequent observation, based on the posterior distribution of the model function acquired by the model estimation functional section;
a data acquisition functional section configured to set the determined parameter value in the target chromatograph and/or spectrometer system, and acquire additional target observation data from the target chromatograph and/or spectrometer system by performing the predetermined type of physical or chemical analysis of a sample while the determined parameter value is set in the target chromatograph and/or spectrometer system; and
a control functional section configured to control the model estimation functional section, the parameter determination functional section, and the data acquisition functional section so as to repeatedly perform processing operations by the model estimation section, the parameter determination section, and the data acquisition section to repeatedly update the determined parameter value;
wherein the data acquisition functional section is configured to set an updated determined parameter value in the target chromatograph and/or spectrometer system as an optimal parameter value of the target chromatograph and/or spectrometer system so that the chromatograph and/or spectrometer system is configured with the updated determined parameter to perform measurements.

13. The non-transitory computer readable medium recording a program according to claim 12, wherein the amount of variation is an amount of shift between the target observation data and the reference observation data within the parameter space.

14. The non-transitory computer readable medium recording a program according to claim 12, wherein the variation estimation functional section is configured to estimate the posterior distribution of the model function of the system for each of the target observation data and the reference observation data independently, determine a correlation between the model function of the system for the target observation data and the model function of the system for the reference observation data for each of a plurality of different amounts of variation given to one of the model functions within the parameter space, and adopt, as an estimated value, the amount of variation which yields a highest degree of correlation.

15. The non-transitory computer readable medium recording a program according to claim 12, wherein the variation estimation functional section is configured to estimate the posterior distribution of the model function for each of a plurality of different amounts of variation given to either the target observation data or the reference observation data within the parameter space, and adopt, as an estimated value, the amount of variation which yields a smallest error between a mean-value model of the posterior distribution of the model function and the corresponding observation data.

16. The non-transitory computer readable medium recording a program according to claim 15, wherein the variation estimation functional section is configured to calculate the posterior distribution of the model function on an assumption that the model function follows a Gaussian process, and adopt, as the estimated value, the amount of variation which shows a highest degree of likelihood in a maximum likelihood estimation of a hyperparameter of the Gaussian process.

* * * * *